United States Patent
Couleur et al.

(10) Patent No.: US 12,451,796 B2
(45) Date of Patent: Oct. 21, 2025

(54) BOOTSTRAPPED POWER SWITCH FOR A NEGATIVE BUCK-BOOST LOW-SIDE

(71) Applicant: Apple Inc., Cupertino, CA (US)

(72) Inventors: Michael Couleur, Rottach-Egern (DE); Bhanupriya Suresh, Munich (DE)

(73) Assignee: Apple Inc., Cupertino, CA (US)

( * ) Notice: Subject to any disclaimer, the term of this patent is extended or adjusted under 35 U.S.C. 154(b) by 213 days.

(21) Appl. No.: 18/473,751

(22) Filed: Sep. 25, 2023

(65) Prior Publication Data

US 2025/0105743 A1  Mar. 27, 2025

(51) Int. Cl.
*H02M 1/08* (2006.01)
*H02M 1/36* (2007.01)
*H02M 3/07* (2006.01)
*H02M 3/158* (2006.01)

(52) U.S. Cl.
CPC .............. *H02M 1/08* (2013.01); *H02M 3/07* (2013.01); *H02M 3/1582* (2013.01); *H02M 3/071* (2021.05)

(58) Field of Classification Search
CPC ............ H02M 1/08; H02M 1/36; H02M 3/07; H02M 3/1582
See application file for complete search history.

(56) References Cited

U.S. PATENT DOCUMENTS

| | | | |
|---|---|---|---|
| 10,447,161 B2 * | 10/2019 | Bayer | H02M 1/08 |
| 11,362,585 B2 | 6/2022 | Rizzolatti et al. | |
| 11,522,458 B2 | 12/2022 | Vispute et al. | |
| 11,658,572 B2 | 5/2023 | Gandhi et al. | |
| 11,675,421 B1 | 6/2023 | Park et al. | |
| 2021/0013808 A1 * | 1/2021 | Cattani | H02M 1/0006 |
| 2021/0126538 A1 * | 4/2021 | Puia | H02M 3/158 |
| 2022/0006382 A1 | 1/2022 | Wu et al. | |
| 2022/0103073 A1 | 3/2022 | Kwak et al. | |

* cited by examiner

*Primary Examiner* — Jue Zhang
(74) *Attorney, Agent, or Firm* — Kowert, Hood, Munyon, Rankin & Goetzel, P.C; Paul T. Seegers; Dean M. Munyon

(57) ABSTRACT

A power converter with a bootstrapped switch is disclosed. A power converter is configured to generate a regulated supply voltage and includes an inductor coupled between a ground node and a switching node. The power converter further includes a switch (e.g., a low-side switch) coupled between the switching node and a supply voltage node, wherein the power converter is configured to generate the supply voltage on the voltage node, and a capacitor, wherein a voltage rating of the capacitor is less than a magnitude of the voltage. The power converter also includes a control circuit configured to, during a first phase, cause the capacitor to accumulate a charge, and during a second phase, cause activation of the switch by causing the capacitor to transfer a portion of the charge to a parasitic capacitance of the switch.

20 Claims, 12 Drawing Sheets

BOOTSTRAPPED POWER SWITCH FOR A NEGATIVE BUCK-BOOST LOW-SIDE

BACKGROUND

Technical Field

This disclosure is directed to electronic circuits, and more particularly, to power conversion circuits.

Description of the Related Art

Modern computer systems may include multiple circuits blocks designed to perform various functions. For example, such circuit blocks may include processors, processor cores configured to execute software, or program instructions. Additionally, the circuit blocks may include memory circuits, mixed-signal or analog circuits, and the like.

In some computer systems, the circuit blocks may be designed to operate using different power supply voltage levels. For example, in some computer systems, power management circuits (also referred to as "power management units") may generate and monitor various power supply signals.

Power management circuits often include one or more power converter circuits configured to generate regulated voltage levels on respective power supply signal lines using a voltage level of an input power supply signal. Such converter circuits may employ multiple reactive circuit elements such as inductors, capacitors, and the like.

SUMMARY

A negative buck-boost power converter with a bootstrapped negative low-side switch is disclosed. In one embodiment, a power converter is configured to generate a negative voltage and includes an inductor coupled between a ground node and a switching node. The power converter further includes a low-side switch coupled between the switching node and a negative voltage node, wherein the power converter is configured to generate the negative voltage on the negative voltage node, and a capacitor, wherein a voltage rating of the capacitor is less than a magnitude of the negative voltage. The power converter also includes a control circuit configured to, during a first phase, cause the capacitor to accumulate a charge, and during a second phase, cause activation of the low-side switch by causing the capacitor to transfer a portion of the charge to a parasitic capacitance of the low-side switch.

The disclosure further contemplates using the techniques described herein for other circuits in which bootstrapping is used. Generally speaking, a circuit in which a capacitor is charged in a first phase and shares a charge with a parasitic capacitance of a switch to be activated in a second phase is contemplated. The capacitor need not be rated for a the full voltage swing of the circuit due to the charge sharing.

BRIEF DESCRIPTION OF THE DRAWINGS

The following detailed description makes reference to the accompanying drawings, which are now briefly described.

DETAILED DESCRIPTION OF EMBODIMENTS

Figure 1A:
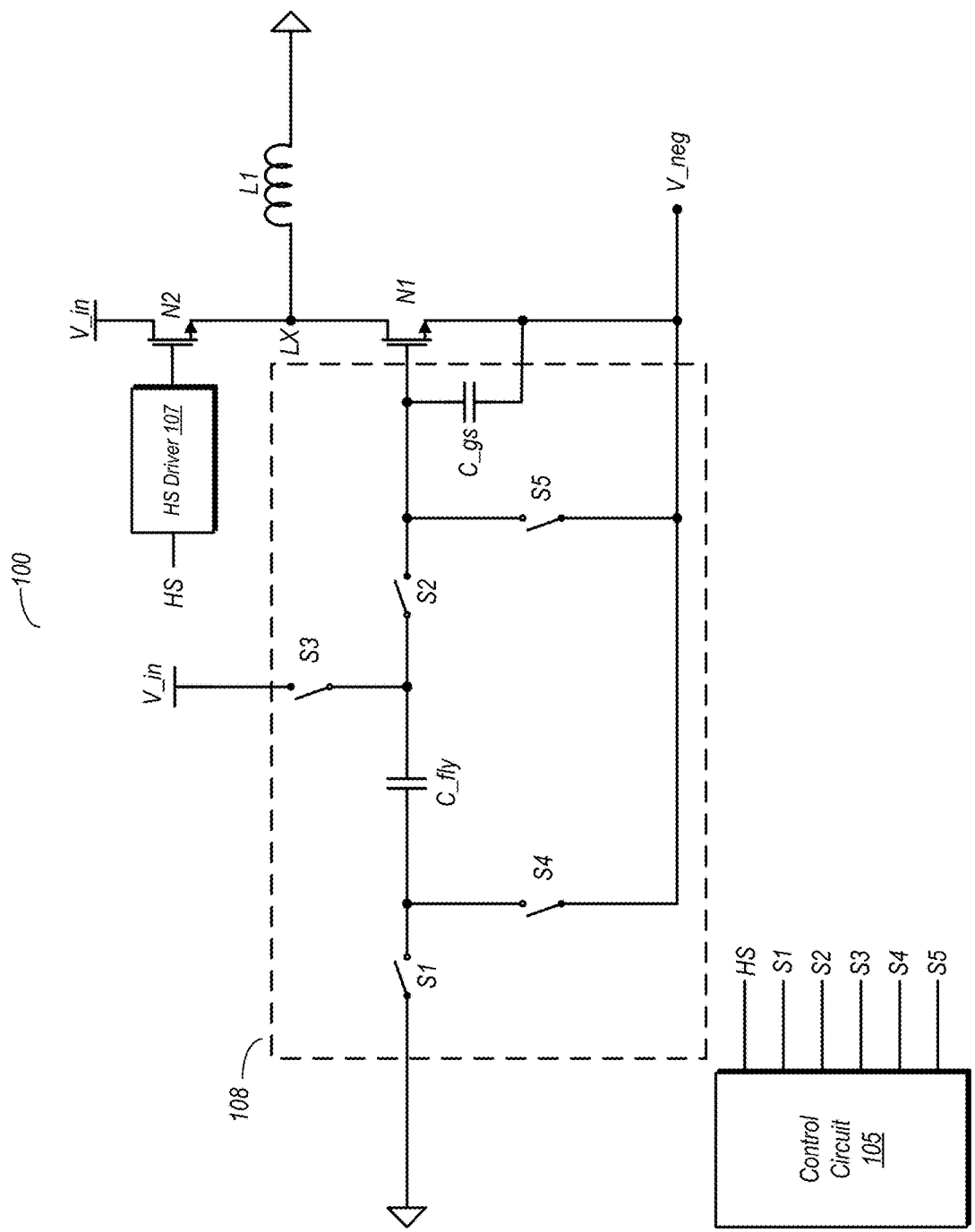
FIG. 1A is a schematic diagram of one embodiment of a power converter.

For certain applications in electronic systems, such as displays, a relatively large negative voltage is required. In such application, an inverting buck-boost converter may be used to provide this negative voltage. In some of these power converters, level shifter circuits are used to generate the gate voltage to turn on a low-side NMOS power FET that has its source referenced to the negative voltage. However, this may be inefficient and can consume a significant amount of power. This problem is greater in portable systems that operate using a battery as an energy source. To overcome this problem, some proposed bootstrapping techniques have been proposed that may be more efficient, but require storing the full negative voltage across a capacitor. Integrating a fly capacitor that can store the full charge with a voltage rating corresponding to the magnitude of the negative voltage is difficult, if not impossible. Other solutions to this problem that have previously been tried involve the use of level shifters for generating the driving voltage to the low-side switch. However, the level shifter solution may reduce the overall efficiency of the voltage regulator, as there is power loss in the level shifting operation.

The present disclosure makes use of the insight that, if the parasitic gate-source capacitance of the low-side power FET is large enough, it can share the charge with the fly capacitor, allowing activation of this switch by bootstrapping. Accordingly, the disclosure contemplates a power converter in which the fly capacitor and the parasitic of the low-side power FET share the charge in order to enable bootstrapping of a switching device. For a power converter configured to generate a negative supply voltage (a negative buck-boost converter), this allows the low-side power FET to be bootstrapped.

During a first phase of operation in various embodiments of a negative buck-boost converter, the fly capacitor is coupled between an input voltage (e.g., a battery voltage) and ground, to charge. Meanwhile, during the first phase the gate-source capacitance of the low-side power FET is discharged by coupling the gate and source terminals (the latter being coupled to the negative voltage terminal) using a switch. During a second phase, the fly capacitor is electrically connected between the gate terminal and the negative voltage terminal, with some of the charge transferred to the inherent gate-source capacitance of the low-side power FET (which is a relatively large value even if smaller than the capacitance of the fly cap). This charge sharing between these two capacitances allows the fly capacitor to be implemented with a smaller voltage rating (less than the full magnitude of the negative voltage rating), as the capacitances of the fly capacitor and the gate-source capacitance are sufficient to handle this voltage. This allows the low-side switch to be turned on and thereby allow generation of the full negative voltage. Accordingly, the power converter may operate with greater efficiency. A smaller fly capacitor can be used and be fully integrated even if its voltage rating is less than the magnitude of the full negative voltage generated on the negative voltage rail.

Figure 1B:
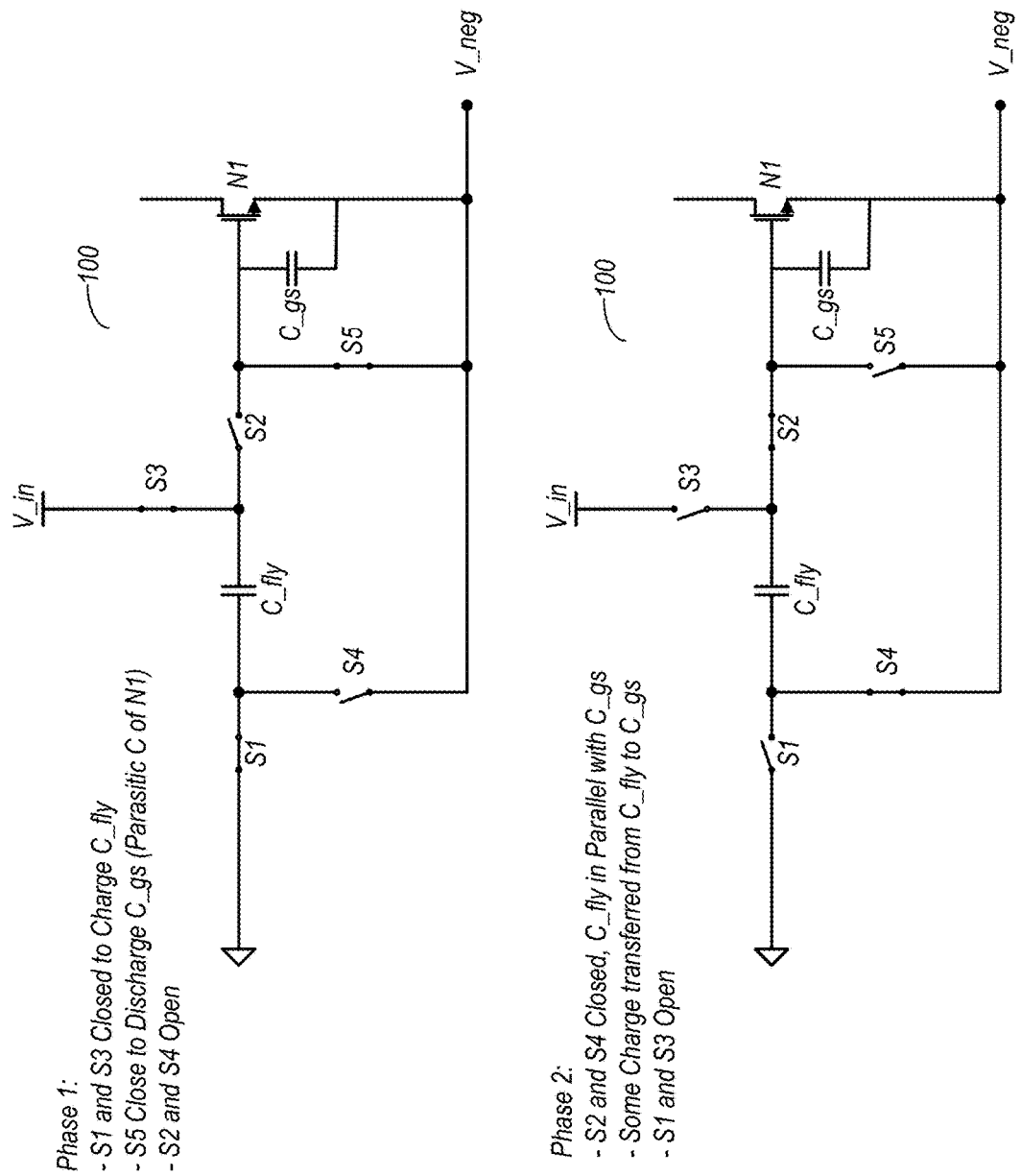
FIG. 1B is a pair of schematic diagrams illustrating operation of one embodiment of a power converter in first and second phases of operation.

Various embodiments of a power converter and supporting circuitry in accordance with the disclosure are now described in further detail. FIGS. 1A and 1B illustrate one embodiment of a power converter according to the disclosure, including a description of the operation in different phases. The discussion continues with another embodiment of a power converter according to the disclosure with reference to FIG. 2. A discussion of schematics of various portions of a power converter according to the disclosure follows with reference to FIGS. 3-5. A system utilizing a power converter of the disclosure is then discussed with reference to FIG. 6. Various methods of operation of different types of power converters according to the disclosure are then discussed with reference to FIGS. 7-8. An example of a device which could include a power converter is discussed with reference to FIG. 9, while different platforms which may implement the same are discussed with reference to FIG. 10. The discussion concludes with a description of a computer readable medium and a fabrication system which can be used to manufacture the circuit.

Power Converter with Bootstrapped Power Switch:

FIG. 1A is a schematic diagram of one embodiment of a power converter according to the disclosure. In the embodiment shown, power converter 100 is a negative buck boost converter configured to generate a negative (as referenced to ground) output voltage on an output voltage node, V_neg. The negative supply voltage may be used to power a load that requires a negative voltage, such as a display, although other load circuits are possible and contemplated.

In the embodiment shown, power converter 100 is a switching power converter includes an inductor L1 coupled between a ground node and a switching node LX. A high-side switch, N2, is coupled between the switching node and an input voltage node, and may be activated and deactivated by high-side driver circuit 107. A low-side driver switch N1 is coupled between the switching node and a negative voltage node, V_neg, from which the negative supply voltage is provided. The capacitance C_gs shown in the drawing is an inherent, parasitic capacitance that exists between the gate and source terminals of N1. Operation may be carried out by alternately activating and deactivating the high-side and low-side switches in accordance with switching regulator operation. The low-side switch N1 may be activated and deactivated in by low-side driver circuit 108, which is now discussed in further detail. Power converter 100 also includes a control circuit 105 which is configured to generate various switching signals to operate the switches of the circuit, including the activation of the high-side switch using the HS signal input into high-side driver 107.

In the embodiment shown, low-side driver circuit 108 includes a capacitor, C_fly, and a number of switches, S1-S5. In one embodiment, C_fly may be integrated on an integrated circuit along with the various switches of low-side driver circuit 108. This capacitor is used as a bootstrap capacitor used to place a driving voltage on the gate of N1 in order to activate this device during operation. In this embodiment, the design of low-side driver circuit 108 in the embodiment shown is such that C_fly is not rated for the full voltage swing between V_in and V_neg. However, during the activation of N1, low-side driver circuit 108 is configured to place C_fly in parallel with the parasitic capacitance of N1, C_gs. By placing these two capacitances in parallel, sufficient capacitance is provided to ensure that the bootstrapped activation of N1 occurs.

The operation of this embodiment of power converter 100 with regard to the bootstrapping operation of low-side switch N1 is shown in FIG. 1B. Operation is carried out in two phases. During a first phase (Phase 1), switches S1, S3, and S5 are closed, which switches S2 and S4 are open. During this portion of operation, low-side switch N1 is deactivated, while high-side switch N2 (not shown in FIG. 1B) is active. With S1 and S3 closed, C_fly is coupled between the input voltage and ground. Thus, C_fly is charged by the difference in voltage between V_in and ground. During this phase, switch S5 is also closed, thereby coupling the gate and source terminals of low-side switch N1. Accordingly, any charge that was previously held the parasitic capacitance C_gs of N1 is discharged due to the fact that both terminals thereof are coupled to the same potential.

In Phase 2, S1 and S3 are opened, thereby disconnecting C_fly from the input voltage and ground. Similarly, S5 is opened, and thus the terminals across which the parasitic capacitance C_gs is found are no longer connected to one another. Meanwhile, switches S2 and S4 are closed. With S1, S3, and S5 open and S2 and S4 closed, capacitor C_fly is thus arranged in parallel with the parasitic capacitance C_gs. When C_fly is in parallel with C_gs in Phase 2, a portion of the charge accumulated by the former, in Phase 1, is transferred to the latter in Phase 2. With C_fly and C_gs sharing charge, the voltage on the gate terminal of N1 is thus sufficient to cause activation of this device.

Operation of power converter 100 may continuously alternate between Phase 1 and Phase 2. In each occurrence of Phase 1, C_fly is charged while C_gs is discharged. During each occurrence of Phase 2, C_fly transfers a portion of its accumulated charge to C_gs. As a result of this shared charge, low-side switch N1 is activated by the voltage across the shared capacitance.

Figure 2:
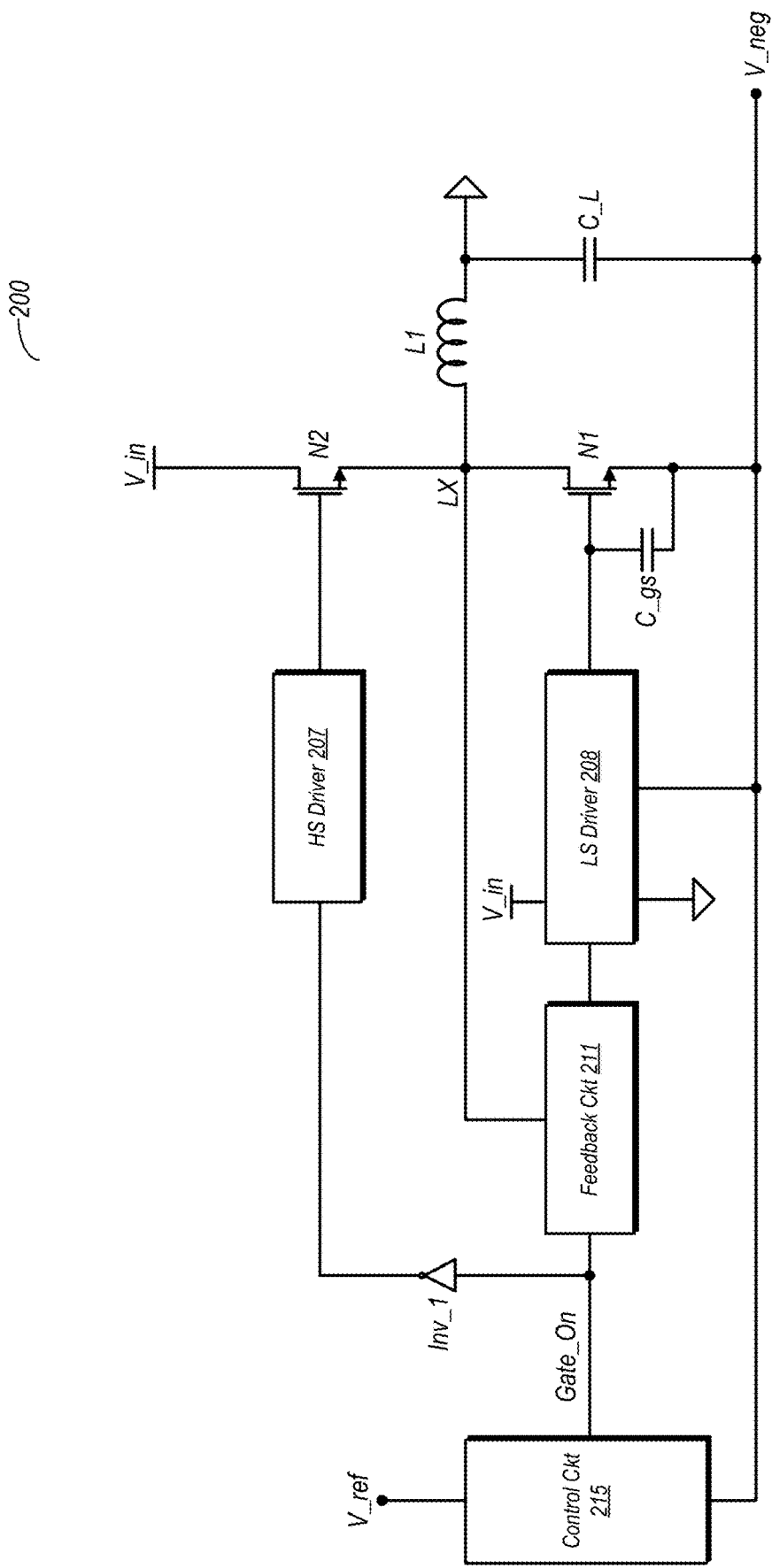
FIG. 2 is a diagram of another embodiment of a power converter.

FIG. 2 is a diagram of another embodiment of a power converter in accordance with the disclosure. In the embodiment shown, power converter 200 includes a high-side driver circuit 207 arranged to drive high-side switch N2, and a low-side driver circuit 208 arranged to drive low-side switch N1. Low-side driver circuit 208 may function in a manner similar to that of FIGS. 1A and 1B, including a fly capacitor that is charged during a first phase (between V_in and ground) and is coupled in parallel with the parasitic capacitance of low-side switch N1, C_gs, during a second phase. An inductor L1 is coupled between the switching node L1 and ground, while a load capacitance C_L is present between ground and V_neg.

Control circuit 215 in the embodiment shown is configured to control operation of power converter 200 using the Gate_On signal, with other control signals being generated based thereon and within the driver circuits. An inverter Inv_1 is coupled between control circuit 210 and high-side driver circuit 207. Accordingly, the alternate activation of high-side switch N2 and low-side switch N1 may be controlled by alternately asserting and de-asserting the Gate_On signal by control circuit 215. Furthermore, control circuit 215 is coupled to receive, as feedback, the supply voltage from the V_neg node, as well as a reference voltage, V_ref. Using these two voltages, control circuit 215 may control operation through different modes such as pulse frequency modulation (PFM) and pulse width modulation (PWM).

Power converter 200 also includes a feedback circuit 211, which controls the timing of activation of low-side switch N1 via low-side driver circuit 207. In particular, feedback circuit 211 prevents a too-early activation of low-side switch N1, which could consume excess energy. In this embodiment, this is accomplished by blocking the Gate_On signal from passing until the switching node voltage has fallen to a particular level (e.g., the voltage on LX is a threshold voltage (Vt) above V_neg), or a time indicated by a timer/delay circuit has elapsed, whichever comes first.

Figure 3:
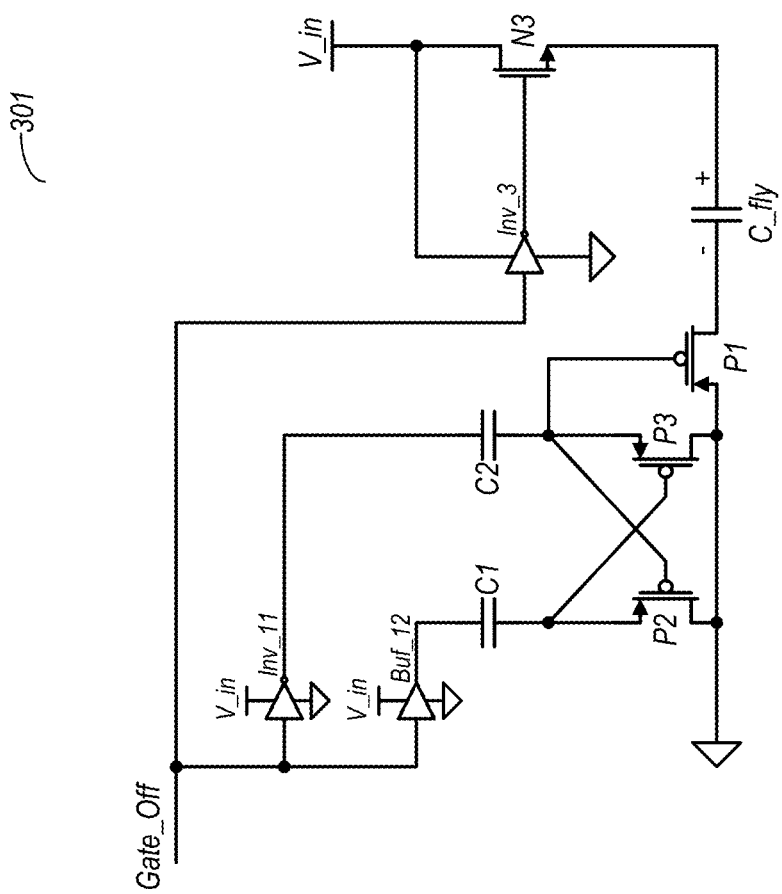
FIG. 3 is a schematic diagram of one embodiment of a charge pump circuit that may be used in a power converter.

Power Converter Components:

FIG. 3 is a schematic diagram of a charge pump circuit usable in one embodiment of a power converter according to the disclosure. Charge pump 301 may be implemented in one embodiment of a low-side driver circuit such as that discussed above in reference to FIG. 3. In particular, charge pump 301 as shown here is a negative charge pump that may carry out the operation of charging C_fly during the first phase by creating electrical paths which couple C_fly to V_in and ground.

In the embodiment shown, when the Gate_Off signal (active low) is asserted, inverter Inv_3 outputs a logic high and activates N3. This creates a path between the positive terminal of C_fly and the input voltage node, V_in. The assertion of the Gate_Off signal also causes a high to be output of inverter Inv_11, while a low is output from buffer Buf_12. The high output from Inv_11 and the low output from Buf_12 results in the activation of P1, which in turn couples the negative terminal of C_fly to ground. With N3 and P1 active, C_fly is charged by the voltage difference between V_in and ground.

When the Gate_Off signal returns high, the output of Inv_3 deactivates N3. Inv_1 also outputs a low, which results in the activation of P3 and thus the deactivation of P1, with P2 also being inactive in this state.

It is noted that the various PMOS devices shown here may have a low voltage swing relative to the full magnitude of the negative voltage output by the power converter. For example, the PMOS devices shown in this particular embodiment may be rated for a 5 volt swing, even if the difference between V_in and V_neg is significantly higher (e.g., 20 volts).

Figure 4:
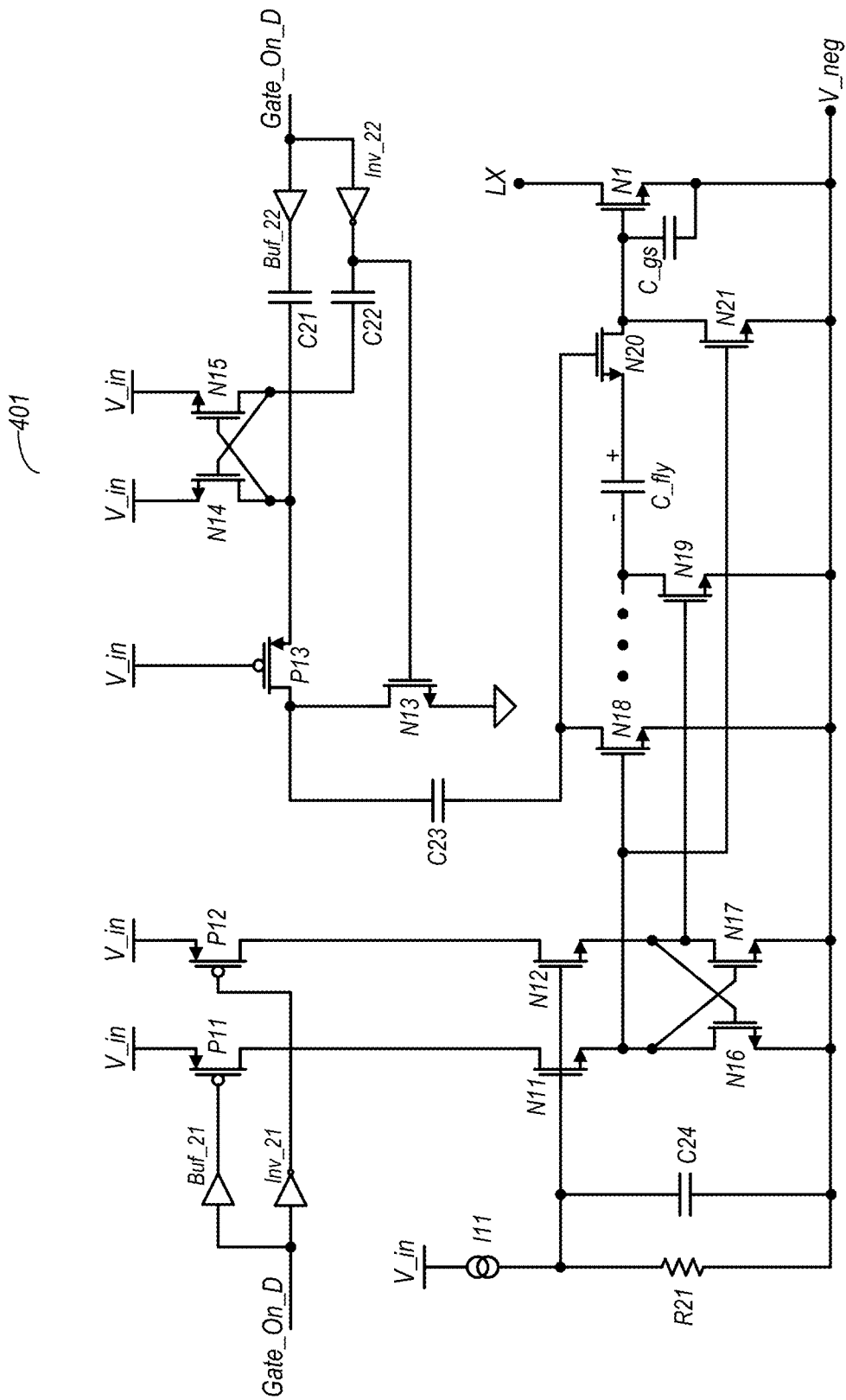
FIG. 4 is a diagram illustrating a portion of one embodiment of a power converter for illustrating certain aspects of operation.

FIG. 4 illustrates additional details of one embodiment of a low-side driver circuit. Although not explicitly shown here, low-side driver circuit 401 shown here may also include the charge pump circuit of FIG. 3 to carry out the charging of C_Fly.

During the low-side switch activation phase, switches N19 and N20 are active, while N21 is inactive. This effectively places C_fly in parallel with the parasitic capacitance C_gs of N1. In this configuration, a portion of the charge that was accumulated on C_fly during the charging phase is transferred to the parasitic capacitance C_gs. The shared charge by these two capacitances results in a sufficient voltage on the gate of N1 to activate this device. The activation of N20 is a result of charge from C23, via P13, and the capacitive level shift provided thereby. When the Gate_On_D signal is high, the output of Inv_22 is low, while N14 is on, thus charging C22 using the potential between V_in and ground. The output of buffer Buf_22 is also high, with charge previously accumulated on C21 raising the voltage on the source of P13 more than a threshold voltage above V_in to allow activation of P13. The terminal C23 coupled to the gate of N20 is thus raised to a voltage sufficient to activate that device.

The activation of N19 occurs via the transistors N12 and P12. Current source I11 and resistor R21 maintain a voltage on N12 sufficient to keep this device active. Meanwhile, the high Gate_On_D results in a low output from Inv_21, which causes activation of P12. Accordingly, a pull-up path exists between the gate terminal of N19 through P12 and N12 to V_in. At the same time, the output of buffer Buf_21 is high, thereby holding P11 inactive.

It is noted the voltage across R21 (and C24) may be less than the magnitude of the potential difference between V_neg and ground, thereby allowing the use of smaller transistors. This includes N11 and N12, as well as cross-coupled devices N16 and N17.

During the other phase of operation, C_fly may be charged as discussed above in reference to FIG. 3, while N19 and N20 are deactivated. The deactivation of N19 is due to the low on Gate_On_D, resulting deactivation of P12, while P11 is activated. With P11 active, a pull-up path is provided between V_in and the gate terminal of N18. This pull-up path also activates N17, which pulls down on the gate voltage of N19, thereby causing its deactivation. With N18 active, N20 is deactivated. Additionally, since the gate terminal of N21 shares the same node as that of N18, the former of these devices is also activated. The activation of N21 discharges the parasitic capacitance C_gs, as the gate and source terminals of N1 are effectively coupled to one another.

Capacitor C23 is charged during this phase as well. When Gate_On is low, the output of Inv_22 is high, thereby activating N13. With N13 and N18 concurrently active, C23 is charged by the potential difference between V_neg and ground. At this point during the operation, N14 is inactive while N15 is active.

Figure 5:
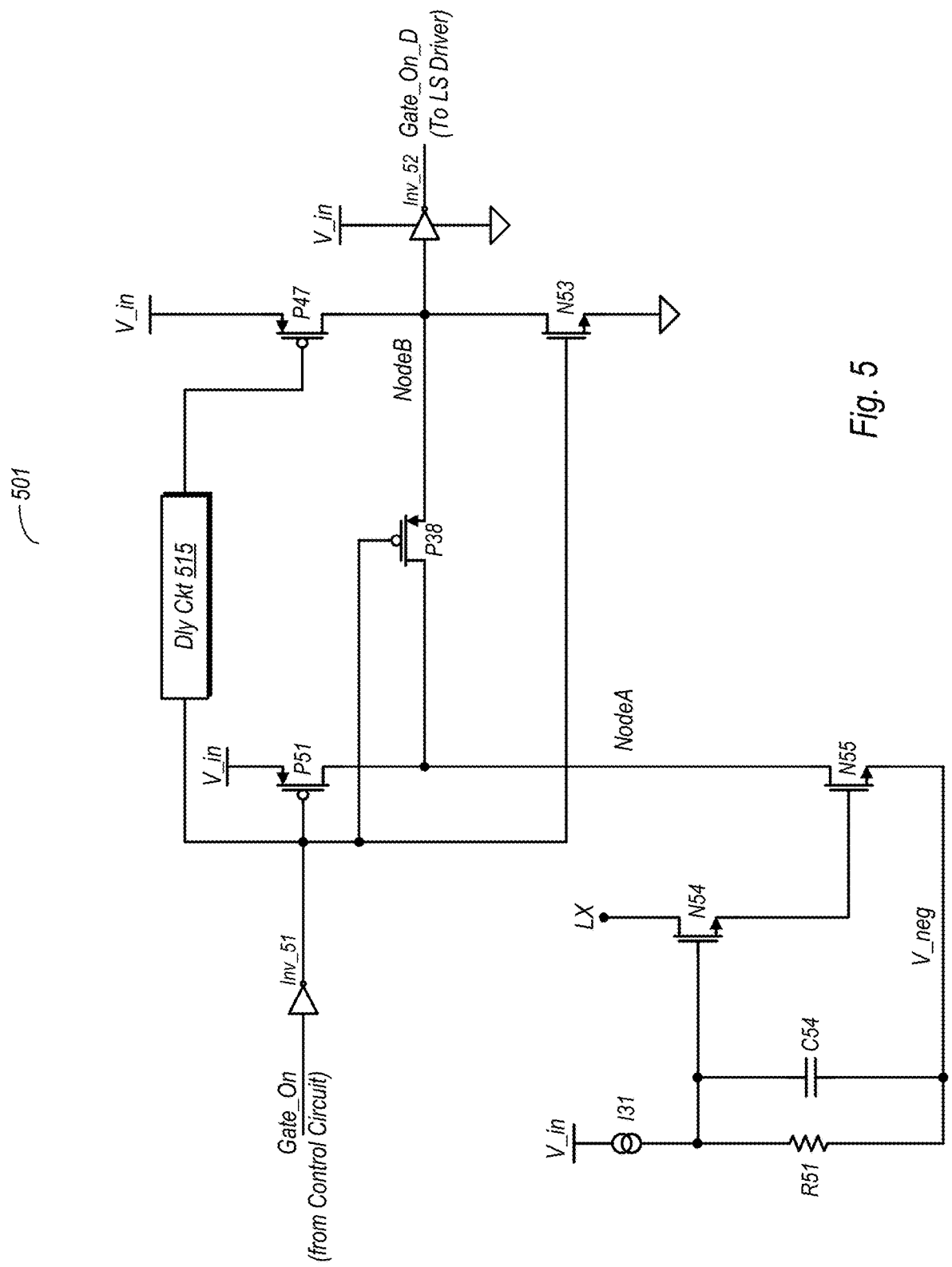
FIG. 5 is a schematic diagram illustrating one embodiment a feedback and delay circuit that may be used in a power converter.

FIG. 5 is schematic diagram of one embodiment of a feedback circuit usable to delay the activation of the low-side switch until the voltage level on the switching node has fallen to a sufficiently low level. If the low-side switch is activated too soon, the overall operation of the power converter is less efficient. Accordingly feedback circuit 501 prevents a too-early activation of the low-side switch in embodiments in which it is implemented.

In the embodiment shown, when Gate_On is asserted, the output of Inv_51 is low, thereby activating P51 and P38. Meanwhile, N54 is held active by the voltage generated by the current from I31 and resistor R51. The voltage on the switching node LX propagates through N54 to the gate terminal of N55, thereby causing this device to be active. In this embodiment, N55 has a greater drive strength than P51, and thus Node A is pulled low when both of these devices are active. This low propagate through P38 to Node B. As the voltage on the switching node LX falls to less than a threshold voltage, N55 is deactivated, and thus Node A is pulled high. The high on Node A is propagated through the active P38 to node B, and thus through inverter Inv_52 to produce the Gate_On_D signal that is provided to the low-side driver circuit. In some embodiments, another inverter may be present if it is desired to produce the Gate_On_D signal at the complement of the logical value produced in this particular embodiment.

In some instances, the voltage on the switching node might not fall fast enough, thereby inhibiting activation of the low-side switch. For example, is the inductor current is negative, the switching node potential cannot be discharged by the inductor current. Accordingly, feedback circuit 501 has an override mechanism to allow activation of the low-side switch when this occurs. Delay circuit 515 in the embodiment shown receives the low output from Inv_51 when Gate_On is high. After a delay time (which may be programmable), delay circuit 515 outputs a corresponding logic low to the gate terminal of P47, causing activation of this device and pulling Node B high. Thus, even if the switching node voltage hasn't fallen sufficiently to de-activated N55 to allow Nodes A and B to be pulled high, P47 may nevertheless be activated to pull Node B high.

Figure 6:
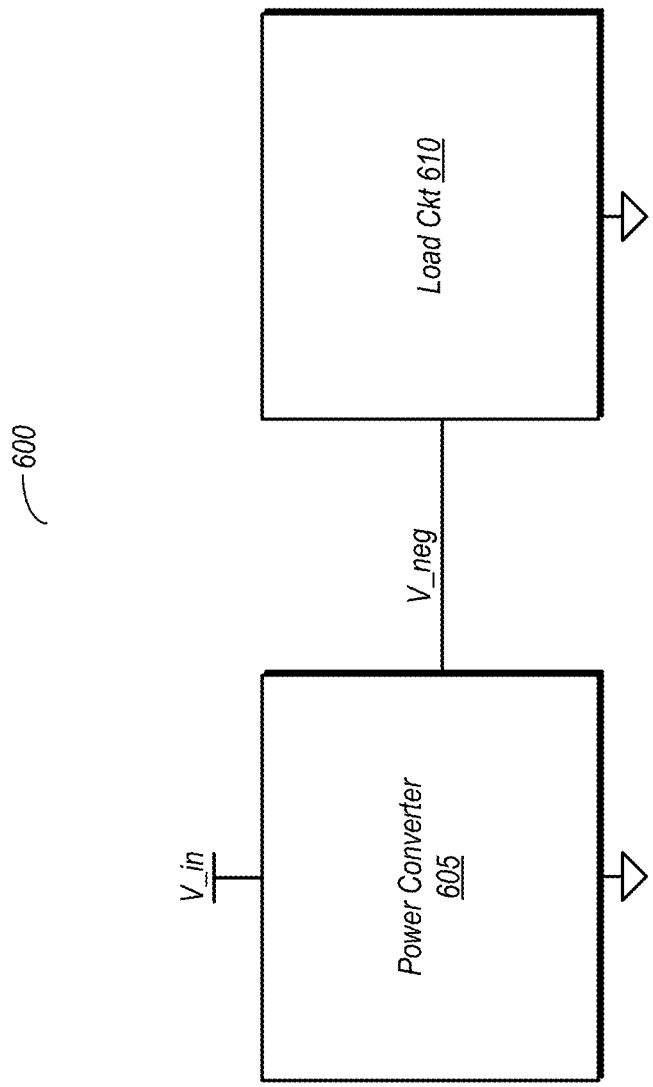
FIG. 6 is a block diagram illustrating one embodiment of a power converter coupled to a load circuit.

Power Converter with Load Circuit:

FIG. 6 is a block diagram of one embodiment of a system including a power converter circuit and a load circuit. In the embodiment shown, power converter 605 is a switching power converter in accordance with the disclosure, coupled to receive an input voltage V_in and configured to generate a negative supply voltage, V_neg. Load circuit 610 in the embodiment shown is a circuit that operates according to the negative supply voltage. In one example application, the load circuit 610 may be a display circuit that operates according to a negative voltage provided by power converter 605. Furthermore, embodiments are possible and contemplated in which power converter 605 and load circuit 610 are implemented in a portable system, with V_in being provided by a battery. However, these examples are not intended to be limiting.

Generally speaking, power converter 605 may be any type of power converter that operates according to the disclosure that includes a capacitor that is charged during a first phase and which, during a second phase, shares the charges with the parasitic capacitance of a switch (e.g., transistor) that is to be activated.

Figure 7:
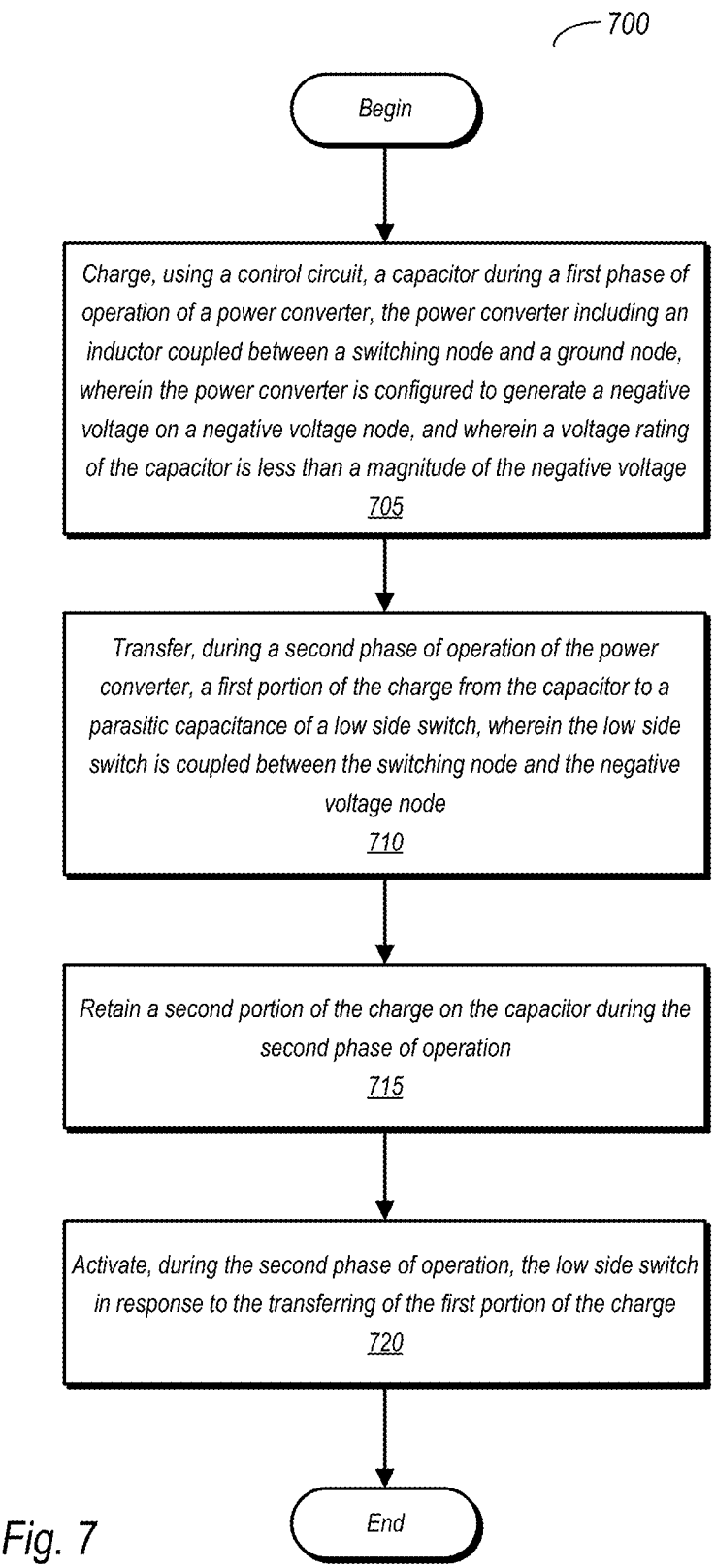
FIG. 7 is a flow diagram illustrating one embodiment of a method for operating a power converter.

Methods of Operation:

FIG. 7 is a flow diagram of one embodiment of a method for operating a power converter. Method 700 may be carried out by any of the various embodiments of a power converter as discussed above. Embodiments of a power converter capable of carrying out Method 700 but not otherwise discussed herein are also considered to fall within the scope of this disclosure.

Method 700 includes charging, using a control circuit, a capacitor during a first phase of operation of a power converter, the power converter including an inductor coupled between a switching node and a ground node, wherein the power converter is configured to generate a negative voltage on a negative voltage node, and wherein a voltage rating of the capacitor is less than a magnitude of the negative voltage (block 705). The method further includes transferring, during a second phase of operation of the power converter, a first portion of the charge from the capacitor to a parasitic capacitance of a low-side switch, wherein the low-side switch is coupled between the switching node and the negative voltage node (block 710). The method also includes retaining a second portion of the charge on the capacitor during the second phase of operation (block 715) and activating, during the second phase of operation, the low-side switch in response to the transferring of the first portion of the charge (block 720).

In various embodiments, the method includes activating, using the control circuit during the first phase, a high-side switch coupled between the switching node and an input voltage node. In various embodiments, the charging of the capacitor comprises coupling the capacitor between the input voltage node and the ground node during the first phase.

Various embodiments of the method, the transferring the portion of the charge to the parasitic capacitance of a low-side switch comprises coupling a first terminal of the capacitor to a gate terminal of the low-side switch, the low-side switch comprising a transistor. In some embodiments, during the second phase, discharging the first portion of the charge by coupling the gate terminal and a source terminal of the transistor to one another. Various embodiments of the method also include controlling timing of activation of the low-side switch using a feedback circuit coupled to the switch node.

It is noted that, while the description is given in terms of a negative buck-boost converter, the disclosure contemplates a similar methodology for bootstrapping a high-side switch of a power converter configured to, e.g., produce a positive voltage. Generally speaking, a power converter in which a capacitor used in a bootstrapping circuit shares charge with a parasitic capacitance of a switch in order to activate that switch may be considered to fall within the scope of this disclosure.

Figure 8:
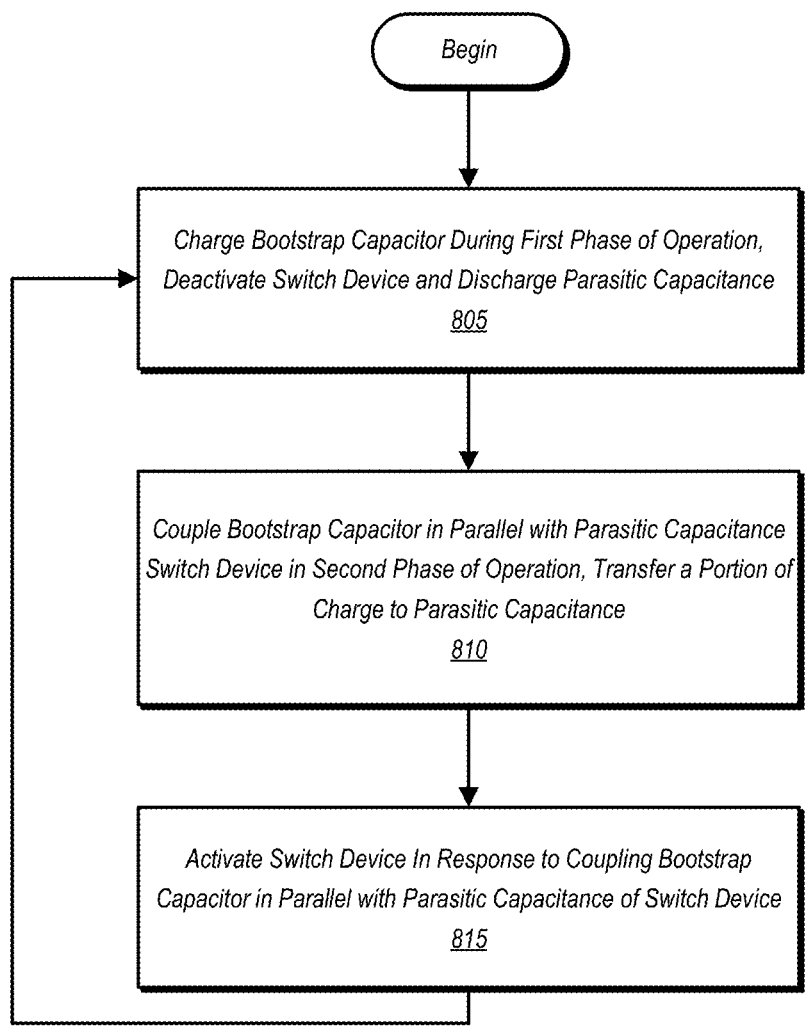
FIG. 8 is a flow diagram illustrating another embodiment of a method for operating a power converter.

A general embodiment of the method is illustrated by the flow diagram of FIG. 8. Method 800 may be carried out on any of the power converter embodiments disclosed herein. Furthermore, the disclosure contemplates carrying out Method 800 on other types of circuits that may utilize bootstrapping to activate a switch. For example, the disclosure contemplates carrying out Method 800 on a power converter that utilizes an NMOS as a high-side switch, with the NMOS activated using bootstrapping techniques.

Method 800 includes charging a bootstrap capacitor during a first phase of operation of the circuit, while deactivating a switch device and discharging that device's parasitic capacitance (block 805). The method further includes, during a second phase of operation, coupling the bootstrap capacitor in parallel with the parasitic capacitance to cause a transfer of a portion of the charge from the former to the latter (block 810). With the charge obtained in the first phase now shared by the bootstrap capacitor and the parasitic capacitance, the switch device is then activated (block 815).

Figure 9:
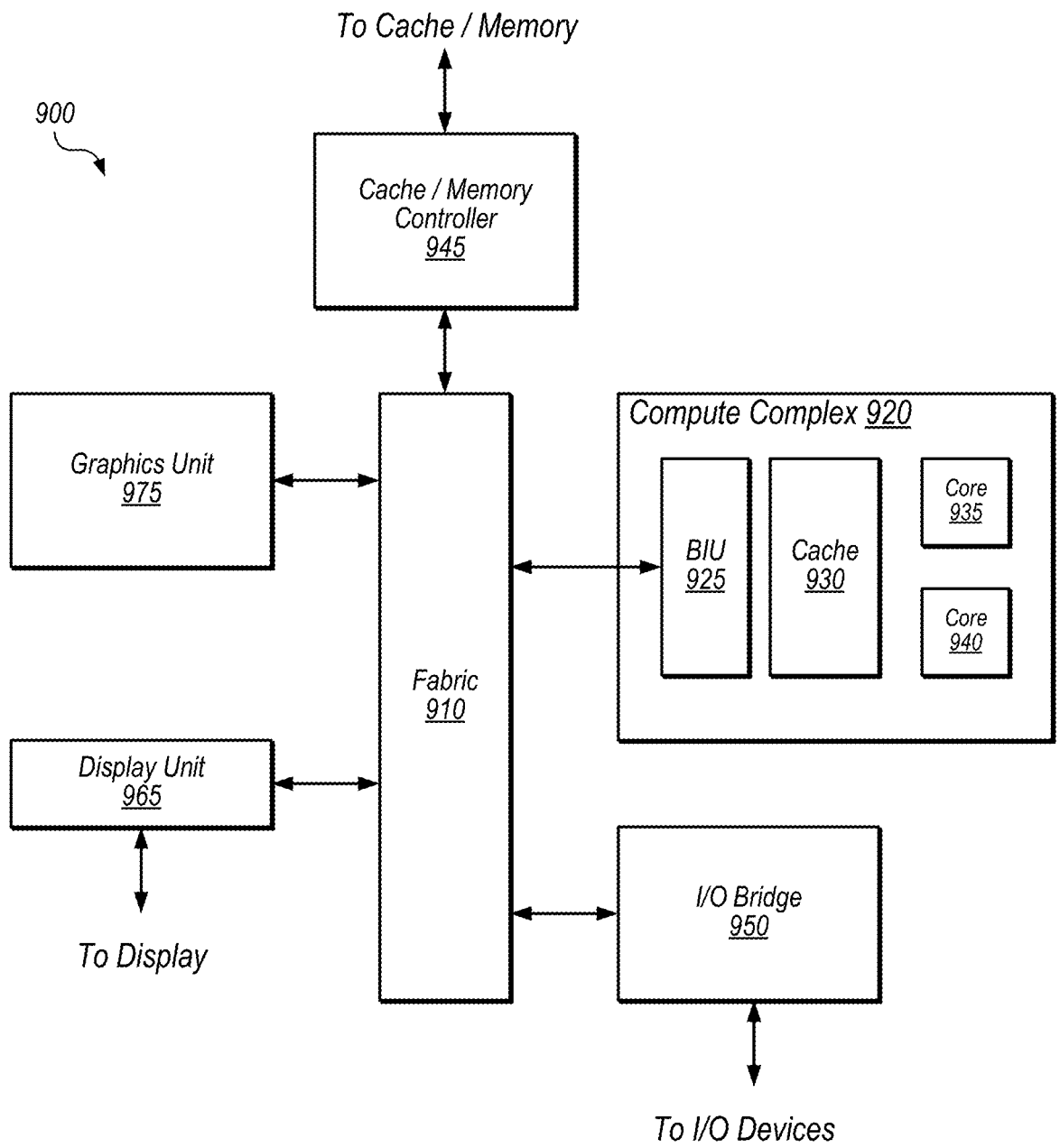
FIG. 9 is a block diagram of one embodiment of an example device which may implement a memory controller according to the disclosure.

Example Device:

Referring now to FIG. 9, a block diagram illustrating an example embodiment of a device 900 is shown. In some embodiments, elements of device 900 may be included within a system on a chip. In some embodiments, device 900 may be included in a mobile device, which may be battery-powered. Therefore, power consumption by device 900 may be an important design consideration. In the illustrated embodiment, device 900 includes fabric 910, compute complex 920 input/output (I/O) bridge 950, cache/memory controller 945, graphics unit 975, and display unit 965. In some embodiments, device 900 may include other components (not shown) in addition to or in place of the illustrated components, such as video processor encoders and decoders, image processing or recognition elements, computer vision elements, etc.

Fabric 910 may include various interconnects, buses, MUX's, controllers, etc., and may be configured to facilitate communication between various elements of device 900. In some embodiments, portions of fabric 910 may be configured to implement various different communication protocols. In other embodiments, fabric 910 may implement a single communication protocol and elements coupled to fabric 910 may convert from the single communication protocol to other communication protocols internally.

In the illustrated embodiment, compute complex 920 includes bus interface unit (BIU) 925, cache 930, and cores 935 and 940. In various embodiments, compute complex 920 may include various numbers of processors, processor cores and caches. For example, compute complex 920 may include 1, 2, or 4 processor cores, or any other suitable number. In one embodiment, cache 930 is a set associative L2 cache. In some embodiments, cores 935 and 940 may include internal instruction and data caches. In some embodiments, a coherency unit (not shown) in fabric 910, cache 930, or elsewhere in device 900 may be configured to maintain coherency between various caches of device 900. BIU 925 may be configured to manage communication between compute complex 920 and other elements of device 900. Processor cores such as cores 935 and 940 may be configured to execute instructions of a particular instruction set architecture (ISA) which may include operating system instructions and user application instructions. These instructions may be stored in computer readable medium such as a memory coupled to memory controller 945 discussed below.

As used herein, the term "coupled to" may indicate one or more connections between elements, and a coupling may include intervening elements. For example, in FIG. 9, graphics unit 975 may be described as "coupled to" a memory through fabric 910 and cache/memory controller 945. In contrast, in the illustrated embodiment of FIG. 9, graphics unit 975 is "directly coupled" to fabric 910 because there are no intervening elements.

Cache/memory controller 945 may be configured to manage transfer of data between fabric 910 and one or more caches and memories. For example, cache/memory controller 945 may be coupled to an L3 cache, which may in turn be coupled to a system memory. In other embodiments, cache/memory controller 945 may be directly coupled to a memory. In some embodiments, cache/memory controller 945 may include one or more internal caches. Memory coupled to controller 945 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 945 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by compute complex 920 to cause the computing device to perform functionality described herein.

Graphics unit 975 may include one or more processors, e.g., one or more graphics processing units (GPUs). Graphics unit 975 may receive graphics-oriented instructions, such as OPENGL®, Metal®, or DIRECT3D® instructions, for example. Graphics unit 975 may execute specialized GPU instructions or perform other operations based on the received graphics-oriented instructions. Graphics unit 975 may generally be configured to process large blocks of data in parallel and may build images in a frame buffer for output to a display, which may be included in the device or may be a separate device. Graphics unit 975 may include transform, lighting, triangle, and rendering engines in one or more graphics processing pipelines. Graphics unit 975 may output pixel information for display images. Graphics unit 975, in various embodiments, may include programmable shader circuitry which may include highly parallel execution cores configured to execute graphics programs, which may include pixel tasks, vertex tasks, and compute tasks (which may or may not be graphics-related).

Display unit 965 may be configured to read data from a frame buffer and provide a stream of pixel values for display. Display unit 965 may be configured as a display pipeline in some embodiments. Additionally, display unit 965 may be configured to blend multiple frames to produce an output frame. Further, display unit 965 may include one or more interfaces (e.g., MIPI® or embedded display port (eDP)) for coupling to a user display (e.g., a touchscreen or an external display). In some embodiments, device 900 may include a power converter such as those discussed above that may be used to provide a regulated supply voltage to a display to which display unit 965 is coupled.

I/O bridge 950 may include various elements configured to implement: universal serial bus (USB) communications, security, audio, and low-power always-on functionality, for example. I/O bridge 950 may also include interfaces such as pulse-width modulation (PWM), general-purpose input/output (GPIO), serial peripheral interface (SPI), and inter-integrated circuit (I2C), for example. Various types of peripherals and devices may be coupled to device 900 via I/O bridge 950.

In some embodiments, device 900 includes network interface circuitry (not explicitly shown), which may be connected to fabric 910 or I/O bridge 950. The network interface circuitry may be configured to communicate via various networks, which may be wired, wireless, or both. For example, the network interface circuitry may be configured to communicate via a wired local area network, a wireless local area network (e.g., via Wi-Fi™), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth® or Wi-Fi™ Direct), etc. In various embodiments, the network interface circuitry may provide device 900 with connectivity to various types of other devices and networks.

Figure 10:
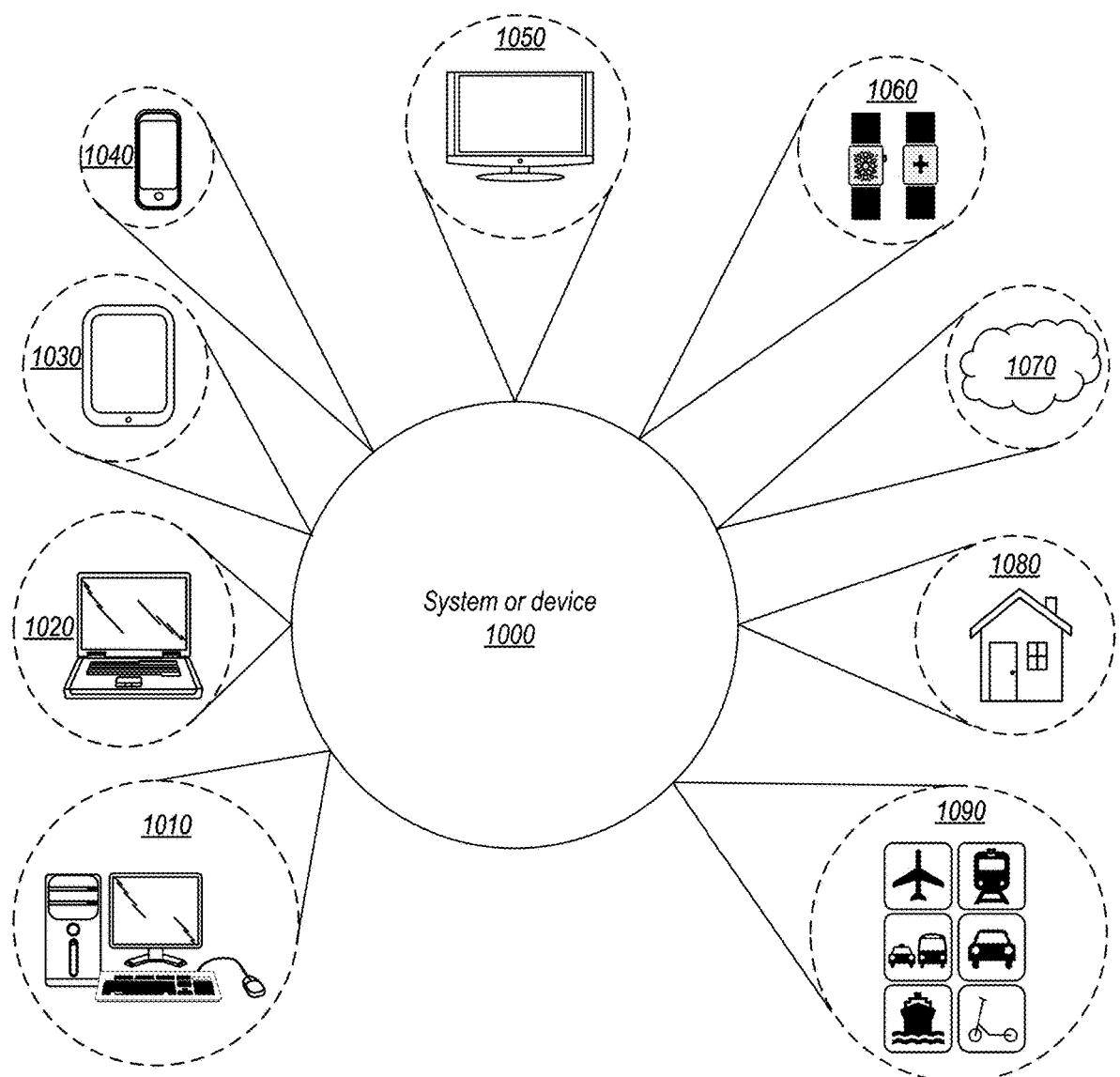
FIG. 10 is a block diagram illustrating example applications of an integrated circuit having a memory controller according to the disclosure.

Example Applications:

Turning now to FIG. 10, various types of systems that may include any of the circuits, devices, or system discussed above. System or device 1000, which may incorporate or otherwise utilize one or more of the techniques described herein, may be utilized in a wide range of areas. For example, system or device 1000 may be utilized as part of the hardware of systems such as a desktop computer 1010, laptop computer 1020, tablet computer 1030, cellular or mobile phone 1040, or television 1050 (or set-top box coupled to a television).

Similarly, disclosed elements may be utilized in a wearable device 1060, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 1000 may also be used in various other contexts. For example, system or device 1000 may be utilized in the context of a server computer system, such as a dedicated server or on shared hardware that implements a cloud-based service 1070. Still further, system or device 1000 may be implemented in a wide range of specialized everyday devices, including devices 1080 commonly found in the home such as refrigerators, thermostats, security cameras, etc. The interconnection of such devices is often referred to as the "Internet of Things" (IT). Elements may also be implemented in various modes of transportation. For example, system or device 1000 could be employed in the control systems, guidance systems, entertainment systems, etc. of various types of vehicles 1090.

The applications illustrated in FIG. 10 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium:

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that programs a computing system to generate a simulation model of the hardware circuit, programs a fabrication system configured to produce hardware (e.g., an integrated circuit) that includes the disclosed circuitry, etc. Claims to such a storage medium are intended to cover, for example, an entity that produces a circuit design, but does not itself perform complete operations such as: design simulation, design synthesis, circuit fabrication, etc.

Figure 11:
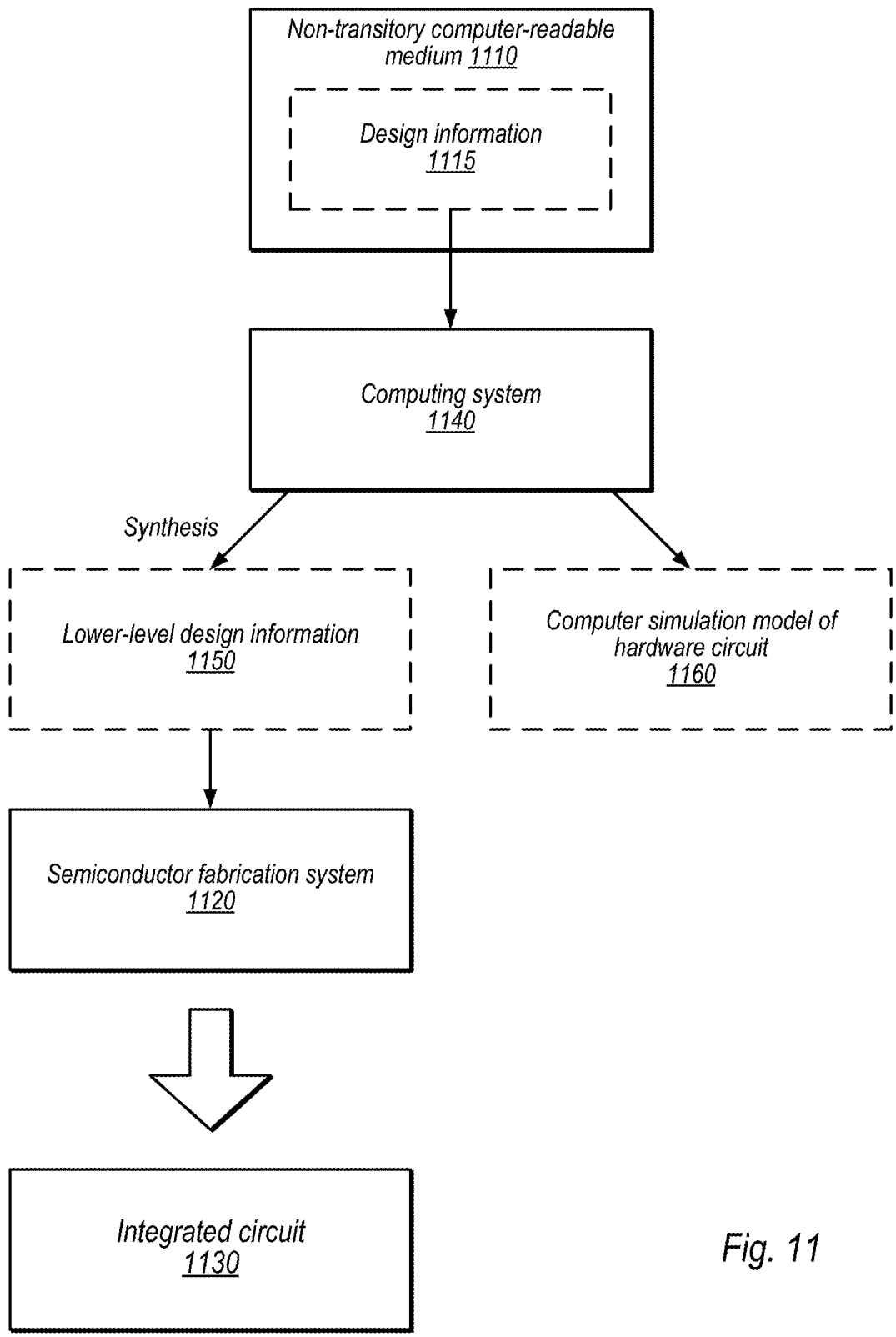
FIG. 11 is a block diagram of one embodiment of a computer readable medium and a manufacturing system capable of manufacturing a circuit including a memory controller according to the disclosure.

FIG. 11 is a block diagram illustrating an example non-transitory computer-readable storage medium that stores circuit design information, according to some embodiments. In the illustrated embodiment, computing system 1140 is configured to process the design information. This may include executing instructions included in the design information, interpreting instructions included in the design information, compiling, transforming, or otherwise updating the design information, etc. Therefore, the design information controls computing system 1140 (e.g., by programming computing system 1140) to perform various operations discussed below, in some embodiments.

In the illustrated example, computing system 1140 processes the design information to generate both a computer simulation model of a hardware circuit 1160 and lower-level design information 1150. In other embodiments, computing system 1140 may generate only one of these outputs, may generate other outputs based on the design information, or both. Regarding the computing simulation, computing system 1140 may execute instructions of a hardware description language that includes register transfer level (RTL) code, behavioral code, structural code, or some combination thereof. The simulation model may perform the functionality specified by the design information, facilitate verification of the functional correctness of the hardware design, generate power consumption estimates, generate timing estimates, etc.

In the illustrated example, computing system 1140 also processes the design information to generate lower-level design information 1150 (e.g., gate-level design information, a netlist, etc.). This may include synthesis operations, as shown, such as constructing a multi-level network, optimizing the network using technology-independent techniques, technology dependent techniques, or both, and outputting a network of gates (with potential constraints based on available gates in a technology library, sizing, delay, power, etc.). Based on lower-level design information 1150 (potentially among other inputs), semiconductor fabrication system 1120 is configured to fabricate an integrated circuit 1130 (which may correspond to functionality of the simulation model 1160). Note that computing system 1140 may generate different simulation models based on design information at various levels of description, including information 1150, 1115, and so on. The data representing design information 1150 and model 1160 may be stored on medium 1110 or on one or more other media.

In some embodiments, the lower-level design information 1150 controls (e.g., programs) the semiconductor fabrication system 1120 to fabricate the integrated circuit 1130. Thus, when processed by the fabrication system, the design information may program the fabrication system to fabricate a circuit that includes various circuitry disclosed herein.

Non-transitory computer-readable storage medium 1110, may comprise any of various appropriate types of memory devices or storage devices. Non-transitory computer-readable storage medium 1110 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1110 may include other types of non-transitory memory as well or combinations thereof. Accordingly, non-transitory computer-readable storage medium 1110 may include two or more memory media; such media may reside in different locations—for example, in different computer systems that are connected over a network.

Design information 1115 may be specified using any of various appropriate computer languages, including hardware description languages such as, without limitation: VHDL, Verilog, SystemC, System Verilog, RHDL, M, MyHDL, etc. The format of various design information may be recognized by one or more applications executed by computing system 1140, semiconductor fabrication system 1120, or both. In some embodiments, design information may also include one or more cell libraries that specify the synthesis, layout, or both of integrated circuit 1130. In some embodiments, the design information is specified in whole or in part in the form of a netlist that specifies cell library elements and their connectivity. Design information discussed herein, taken alone, may or may not include sufficient information for fabrication of a corresponding integrated circuit. For example, design information may specify the circuit elements to be fabricated but not their physical layout. In this case, design information may be combined with layout information to actually fabricate the specified circuitry.

Integrated circuit 1130 may, in various embodiments, include one or more custom macrocells, such as memories, analog or mixed-signal circuits, and the like. In such cases, design information may include information related to included macrocells. Such information may include, without limitation, schematics capture database, mask design data, behavioral models, and device or transistor level netlists. Mask design data may be formatted according to graphic data system (GDSII), or any other suitable format.

Semiconductor fabrication system 1120 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1120 may also be configured to perform various testing of fabricated circuits for correct operation.

In various embodiments, integrated circuit 1130 and model 1160 are configured to operate according to a circuit design specified by design information 1115, which may include performing any of the functionality described herein. For example, integrated circuit 1130 may include any of various elements shown above with regard to FIGS. 1A-6, in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components. Similarly, stating "instructions of a hardware description programming language" that are "executable" to program a computing system to generate a computer simulation model" does not imply that the instructions must be executed in order for the element to be met, but rather specifies characteristics of the instructions. Additional features relating to the model (or the circuit represented by the model) may similarly relate to characteristics of the instructions, in this context. Therefore, an entity that sells a computer-readable medium with instructions that satisfy recited characteristics may provide an infringing product, even if another entity actually executes the instructions on the medium.

Note that a given design, at least in the digital logic context, may be implemented using a multitude of different gate arrangements, circuit technologies, etc. As one example, different designs may select or connect gates based on design tradeoffs (e.g., to focus on power consumption, performance, circuit area, etc.). Further, different manufacturers may have proprietary libraries, gate designs, physical gate implementations, etc. Different entities may also use different tools to process design information at various layers (e.g., from behavioral specifications to physical layout of gates).

Once a digital logic design is specified, however, those skilled in the art need not perform substantial experimentation or research to determine those implementations. Rather, those of skill in the art understand procedures to reliably and predictably produce one or more circuit implementations that provide the function described by the design information. The different circuit implementations may affect the performance, area, power consumption, etc. of a given design (potentially with tradeoffs between different design goals), but the logical function does not vary among the different circuit implementations of the same circuit design.

In some embodiments, the instructions included in the design information instructions provide RTL information (or other higher-level design information) and are executable by the computing system to synthesize a gate-level netlist that represents the hardware circuit based on the RTL information as an input. Similarly, the instructions may provide behavioral information and be executable by the computing system to synthesize a netlist or other lower-level design information. The lower-level design information may program fabrication system 1120 to fabricate integrated circuit 1130.

It is noted that while the circuits discussed above have been implemented using NMOS and PMOS transistors, the disclosure is not intended to limit embodiments falling within its scope to these types of devices. Thus, in addition to various MOSFET types discussed above, the present disclosure also contemplates embodiments that use non-planar devices such as FinFETs, GAAFETs (Gate All Around FETs), among other types. Embodiments implemented using Bipolar devices are also possible and contemplated. The disclosure further contemplates that technologies that are speculative as of this writing may be used to implement devices in various embodiments of the circuits discussed herein. These technologies include (but are not limited to) graphene transistors, carbon nanotube transistors, gallium arsenide, silicon carbide, and so on. The use of memristors in certain circuit structures is also contemplated.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s)

of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some tasks even if the structure is not currently being operated. Thus, an entity described or recited as being "configured to" perform some tasks refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. An apparatus comprising:
a power converter configured to generate a negative voltage, the power converter including:
an inductor coupled between a ground node and a switching node;
a low-side switch coupled between the switching node and a negative voltage node, wherein the power converter is configured to generate the negative voltage on the negative voltage node;
a capacitor, wherein a voltage rating of the capacitor is less than a magnitude of the negative voltage; and
a control circuit configured to, during a first phase, cause the capacitor to accumulate a charge, and during a second phase, cause activation of the low-side switch by causing the capacitor to transfer a portion of the charge to a parasitic capacitance of the low-side switch.

2. The apparatus of claim 1, wherein, during the first phase, the control circuit is configured to cause the capacitor to be coupled between an input voltage node and a ground node.

3. The apparatus of claim 2, wherein the low-side switch comprises a transistor, and wherein, during the second phase, the control circuit is configured to cause the capacitor to be coupled between the negative voltage node and a gate terminal of the capacitor.

4. The apparatus of claim 3, wherein the transistor comprises a drain terminal coupled to the switching node and a source terminal coupled to the negative voltage node.

5. The apparatus of claim 4, wherein, during the first phase, the control circuit is configured to couple the source terminal to the gate terminal.

6. The apparatus of claim 3, wherein the control circuit is configured to, in causing the capacitor to be coupled between the negative voltage node and the gate terminal of the transistor, is configured to cause the capacitor to be placed in parallel with the parasitic capacitance.

7. The apparatus of claim 2, further comprising a high-side switch coupled between the switching node and an input voltage node.

8. The apparatus of claim 1, further comprising a negative charge pump, a first switch, and a second switch, wherein, during the first phase, the control circuit is configured to activate the first switch to couple a first terminal of the capacitor to an input voltage, and further configured to cause the charge pump to activate the second switch to couple a second terminal of the capacitor a ground node.

9. The apparatus of claim 1, further comprising a discharge circuit configured to, during the first phase, discharge the portion of the charge from the parasitic capacitance.

10. The apparatus of claim 1, further comprising a feedback circuit coupled to the switching node, wherein the feedback circuit is configured to control a timing of activation of the low-side switch.

11. A method comprising:
charging, using a control circuit, a capacitor during a first phase of operation of a power converter, the power converter including an inductor coupled between a switching node and a ground node, wherein the power converter is configured to generate a negative voltage on a negative voltage node, and wherein a voltage rating of the capacitor is less than a magnitude of the negative voltage;
transferring, during a second phase of operation of the power converter, a first portion of the charge from the capacitor to a parasitic capacitance of a low-side switch, wherein the low-side switch is coupled between the switching node and the negative voltage node;
retaining a second portion of the charge on the capacitor during the second phase of operation; and
activating, during the second phase of operation, the low-side switch in response to the transferring of the first portion of the charge.

12. The method of claim 11, further comprising activating, using the control circuit during the first phase, a high-side switch coupled between the switching node and an input voltage node.

13. The method of claim 12, wherein the charging of the capacitor comprises coupling the capacitor between the input voltage node and the ground node during the first phase.

14. The method of claim 11, wherein the transferring the first portion of the charge to the parasitic capacitance of a low-side switch comprises coupling a first terminal of the capacitor to a gate terminal of the low-side switch, the low-side switch comprising a transistor.

15. The method of claim 14, further comprising, during the second phase, discharging the first portion of the charge by coupling the gate terminal and a source terminal of the transistor to one another.

16. The method of claim 11, further comprising controlling timing of activation of the low-side switch using a feedback circuit coupled to the switch node.

17. A system comprising:
a load circuit configured to operate using a negative supply voltage; and
an inverting power converter configured to generate the negative supply voltage on a negative voltage node, wherein the inverting power converter includes:
a low-side switch coupled between a switching node and the negative voltage node;
a capacitor having a first terminal coupled to a control terminal of the low-side switch; and
a control circuit configured to, during a first phase, cause the capacitor to accumulate a charge, and, during a second phase, transfer a portion of the charge to a parasitic capacitance of the low-side switch, wherein the low-side switch is configured to activate in response to the transfer of the portion of the charge.

18. The system of claim 17, further comprising:
a negative charge pump, a first switch, and a second switch, wherein, during the first phase, the control circuit is configured to activate the first switch to couple a first terminal of the capacitor to an input voltage, and further configured to cause the negative charge pump to activate the second switch to couple a second terminal of the capacitor a ground node; and
a discharge circuit configured to, during the first phase, discharge the portion of the charge from the parasitic capacitance.

19. The system of claim 17, further comprising a feedback circuit coupled to the switching node, wherein the feedback circuit is configured to control a timing of activation of the low-side switch.

20. The system of claim 17, further comprising a high-side switch coupled between the switching node and an input voltage node.

* * * * *